UNITED STATES PATENT OFFICE 2,538,180

POLYAZO DYESTUFFS

Willy Widmer, Bottmingen, Switzerland, assignor to Ciba Limited, Basel, Switzerland, a Swiss firm No Drawing. Application March 31, 1947, Serial No. 738,489. In Switzerland April 16, 1946

7 Claims. (Cl. 260—160)

REISSUED
JUN 12 1951
RE 23,380

According to this invention valuable new polyazo-dyestuffs free from sulfonic acid groups are made by using as a coupling component a compound of the general formula $$Py_1\text{—}R_1\text{—}Py_2$$

in which $R_1$ represents the radical of a diphenyl bound in the 4- and 4'-positions to $Py_1$ and $Py_2$, and $Py_1$ and $Py_2$ each represent the radical of a pyrazolone bound in the 1-position to the diphenyl radical, and using at least once as a diazo-component a diazo-compound of an amine of the general formula

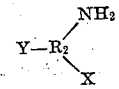

in which $R_2$ represents a benzene radical, X represents a group occupying a position vicinal to the —NH$_2$ group and capable of taking part in the formation of heavy metal complexes, and Y represents an acid amide group bound by the aci dradical to $R_2$, and, if desired, treating the resulting dyestuff with an agent yielding metal.

Among the coupling components of the above general formula $Py_1$—$R_1$—$Py_2$, which are used as starting materials in the process of the invention, there come into consideration those in which the diphenyl radical $R_1$ is free from further substituents, and also those which contain further substituents, in the diphenyl radical, for example, alkyl groups such as a methyl group, alkoxy groups such as a methoxy group, or halogen atoms such as chlorine. In the latter case the same substituent may be present twice or more in the diphenyl radical, or the substituents may differ from one another, and each individual substituent may be present once or more than once. As examples of such coupling components there may be mentioned, among others, those in which the radical $R_1$ represents the following radicals: 3:3' - dimethyldiphenyl-, 3:3' - dimethoxydiphenyl-, 3:3' - dichlorodiphenyl- and principally the unsubstituted diphenyl residue. The two pyrazolone radicals $Py_1$ and $Py_2$ present in the coupling components of the above formula may, for example, differ from one another. It is of advantage to use coupling components which contain the same pyrazolone radical twice. The pyrazolone radicals may contain a substituent in the 3-position, for example, a carboxyl group. There come principally into consideration, however, compounds which contain in that position an alkyl group, especially a methyl group. As example of coupling components which can be used with advantage as starting materials in the process of the invention there may be mentioned dipyrazolones obtained from 1 molecular proportion of 4:4'-diaminodiphenyl or 3:3'-dichloro-4:4'-diaminodiphenyl and 2 molecular proportions of acetoacetic acid ester or oxalyl acetic acid ester (the pyrazolones being obtained in the usual manner by tetrazotizing the diaminodiphenyl-compound, reducing the product to the corresponding dihydrazine, and condensing the latter with acetoacetic acid ester or oxalyl acetic acid ester). Especially valuable dyestuffs can be obtained, for example, with the dipyrazolone from 4:4'-diaminodiphenyl and acetoacetic acid ester.

In the diazo-compounds of amines of the general formula

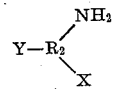

also used as starting materials in the present process, X represents a group occupying a position vincinal to the —NH$_2$— group and capable of taking part in the formation of heavy metal complexes, for example, a carboxyl group or a methoxy group. Especially valuable results can be obtained with those diazo-components which contain in that position a hydroxyl group. The substituent Y in the diazo-components of the above formula represents an acid amide group, for example, a carboxylic acid amide group or a sulfonamide group. The nitrogen atom in the acid amide group may be free from substituents, or may have one or two substituents, for example, one or two alkyl radicals such as methyl and/or ethyl, or an aryl radical, or an aryl radical and an alkyl radical, a benzene radical coming principally into consideration as an aryl radical and which benzene radical may, if desired, carry further substituents. The acid amide group Y may occupy any desired position in the benzene radical $R_2$. However, owing to their easy accessibility there come into consideration especially those diazo-components in which the acid amide group is in the 4-position relatively to the group X and principally when the X represents an alkoxy or hydroxyl group. In addition to the —NH$_2$, —X and —Y groups, the benzene radical $R_2$ may contain further substituents, for example a nitro group, an alkyl group such as methyl, or a halogen atom such as chlorine. As examples of diazo-components of the above formula there may be mentioned:

2-amino-1-hydroxy - 4 - benzanilide, 2 - amino-1-hydroxy-6-chloro - 4 - benzanilide, 2-amino-1-hydroxy-4-chloro - 6 - benzanilide, 2-amino-1 - hydroxy-4-nitro - 6 - benzanilide, 2 - amino-1-hydroxy-4-benzoic acid-(4'-dimethylsulfonyl-phenylanilide), 2 - amino-1-hydroxy-4-sulfonic acid anilide, 2-amino-1-hydroxy-4-sulfonic acid methyl-anilide, 2 - amino-1-methoxy-4-sulfonic acid anilide and 2-amino-1-($\beta$-carboxy-methoxy-)-4-benzanilide.

Especially valuable dyestuffs can be obtained by using as starting materials in the present process diazo-compounds of amines of the general formula

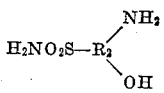

in which $R_2$ represents a benzene radical and the groups —$NH_2$ and —OH occupy positions vicinal to one another. Such amines are, for example, 6-chloro - 2 - amino-1-hydroxybenzene-4-sulfonamide, 6 - nitro - 2 - amino-1-hydroxybenzene-4-sulfonamide, 6 - methyl-2-amino-1-hydroxybenzene-4-sulfonamide and principally 2-amino-1-hydroxybenzene-4-sulfonamide.

By the present process there may be produced, for example, asymmetrical polyazo-dyestuffs by coupling 1 molecular proportion of a coupling component of the formula first mentioned above, on the one hand, with 1 molecular proportion of a diazo-compound of an amine of the general formula

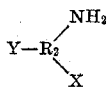

in which $R_2$, X and Y have the meanings given above and, on the other, with 1 molecular proportion of any desired diazo-component. As the second diazo-component there is advantageously chosen one which, even when it contains no acid amide group, likewise contains as a substituent in ortho-position relatively to the diazotizable amino-group a group capable of taking part in the formation of heavy metal complexes. The second diazo-component may also be a diazotized aminoazo-dyestuff. Examples of such diazo components are: 1-aminobenzene-2-carboxylic acid, 1-amino-2-phenoxy-acetic acid, 4-amino-4'-hydroxy-1:1'-azobenzene - 3:3' - dicarboxylic acid.

It is of especial advantage in the present process to couple 1 molecular proportion of a coupling component of the formula first mentioned above with 2 molecular proportions of a diazo-compound of an amine of the general formula

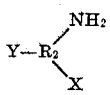

in which $R_2$, Y and X have the meanings given above, whereby symmetrical disazo-dyestuffs are obtained, provided that the coupling component is symmetrical.

The coupling reaction may be conducted in an acid, neutral or advantageously an alkaline medium. When asymmetrical dyestuffs are made by the present process by coupling 1 molecular proportion of a dipyrazolone of the formula first mentioned above with 1 molecular proportion of two different diazo-compounds, it is recommended to conduct the first coupling with one diazo-component in an acid medium, advantageously a medium rendered acid with acetic acid, and then the coupling with the other diazo-component in an alkaline medium it is in most cases of advantage to dissolve the coupling component with the aid of a small excess of an alkali hydroxide so that it is present in the form of its di-alkali salt, and to add the further quantity of alkali required for coupling in the form, for example, of an alkali carbonate. The working up of the resulting dyestuffs is carried out in a manner in itself known, for example, by filtration and drying.

The polyazo-dyestuffs free from sulfonic acid groups obtainable by the present process are new and correspond to the general formula

in which $R_1$ represents the radical of a diphenyl bound in the 4- and 4'-positions to $Py_1$ and $Py_2$, $Py_1$ and $Py_2$ each represent the radical of a pyrazolone bound in the 1-position to the diphenyl radical and in the 4-position to the —N=N— group, and $R_3$ and $R_4$ each represent the radical of a diazo-component of which at least one corresponds to the general formula

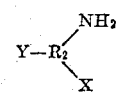

in which $R_2$ represents a benzene radical, X represents a group occupying a position vicinal to the —$NH_2$— group and capable of taking part in the formation of heavy metal complexes, and Y represents an acid amide group bound by the acid radical to $R_2$.

The polyazo-dyestuffs obtained by the present process are suitable for dyeing a very wide variety of materials, especially cellulose fibers such as cotton and artificial silk and staple fibers of regenerated cellulose, and also animal fibers such as wool, silk and leather. They can be converted in substance, in the dyebath or on the fiber into complex metal compounds, for example, copper, chromium, iron, nickel or cobalt compounds. The conversion into such complex metal compounds, which may contain a plurality of metals in the complex, is carried out by the known methods in an acid, neutral or alkaline solution with or without suitable additions such as salts of inorganic or organic acids, salts of acids forming complexes such as tartaric acid or aminoacetic acid, in the presence or absence of a diluent or suspending medium such as pyridine or glycerine, and under atmospheric or super-atmospheric pressure. Furthermore, many of the complex metal compounds produced in substance, especially cobalt and/or nickel compounds, can be used for coloring masses and solutions thereof, such as nitrocellulose lacquers, artificial resins and spinning masses.

Notwithstanding that the polyazo-dyestuffs of the invention contain no sulfonic acid groups they generally have an adequate solubility and a good affinity for cellulose fibers in the metal-free condition. They may with advantage be treated on the fiber or in the dyebath or partly on the fiber and partly in the dyebath by known methods with agents yielding metal. It is, however, of advantage to use the process described in U. S. Patent No. 2,148,659, in which the material is first dyed and then treated in the same bath with an agent yielding metal. As agents yielding metal there come into consideration preferably those which are stable towards alkaline solutions, such as complex copper tartrates and the like.

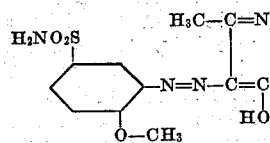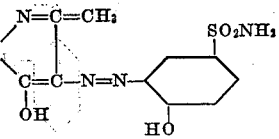

In U. S. Patent No. 2,228,374 there are described polyazo-dyestuffs obtained from 1:1'-[diphenylene-(4:4')]-bis-(3-methyl - 5 - pyrazolone) and various diazo-components. These dyestuffs in all cases contain groups imparting solubility such as sulfonic acid groups and/or carboxyl groups, but in no case a sulfonamide group. As compared with these known dyestuffs the new dyestuffs of the present invention containing sulfonamide groups have important advantages, for example, they yield dyeings of better fastness to washing and/or they have a better affinity towards cellulose fibers.

The following examples illustrate the invention, the parts being by weight:

*Example 1*

3.76 parts of 2-amino-1-hydroxybenzene-4-sulfonamide are diazotized in the usual manner in a hydrochloric acid solution. The resulting suspension of the diazo-compound is neutralized by the addition of sodium carbonate, and coupled with a solution of 3.6 parts of 1:1'-[diphenylene-(4:4')]-bis-(3-methyl-5-pyrazolone) in 40 parts of a caustic soda solution of 2.5 per cent. strength and 10 parts of a sodium carbonate solution of 10 per cent. strength. When the coupling is complete the precipitated dyestuff of the formula

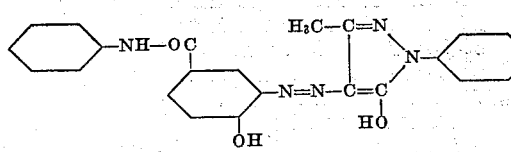

is separated by filtration and dried. It is an orange-brown powder, which dissolves in hot water with an orange-yellow coloration, and dyes cellulose fibers by the single bath or two-bath after-coppering process reddish yellow tints which are especially fast to washing and light.

*Example 2*

2 parts of 1-methoxy-2-aminobenzene-4-sulfonamide are diazotized in the usual manner in a hydrochloric acid solution, and then stirred with a suspension, rendered acid with acetic acid and containing sodium acetate, of 3.5 parts of 1:1'-[diphenylene-(4:4')]-bis-(3 - methyl-5-pyrazolone) while cooling with ice until the diazo-compound can no longer be detected. The product is then coupled with the diazo-compound obtained by diazotizing 1.9 parts of 1-hydroxy-2-aminobenzene-4-sulfonamide and neutralization with sodium carbonate, a quantity of sodium carbonate solution is added sufficient to give a distinctly alkaline reaction with Brilliant Yellow paper, and the whole is stirred while cooling until the diazo-compound disappears. The dyestuff of the formula

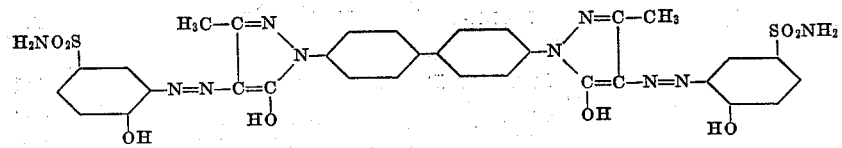

after being separated and dried in a red-brown powder which dissolves in concentrated sulfuric acid with a yellow coloration and in dilute alkaline with an orange-yellow coloration, and dyes cellulose fibers by the single bath or two-bath after-coppering process fast reddish yellow tints.

Dyestuffs having similar properties are obtained by starting from 1-aminobenzene-2-carboxylic acid or 1-amino-2-phenoxyacetic acid or 4-amino-4'-hydroxy-1:1'- azobenzene - 3:3' - dicarboxylic acid instead of from 1-methoxy-2-aminobenzene-4-sulfonamide, and proceeding according to the data of this example.

*Example 3*

4.6 parts of 1-hydroxy-2-amino-benzene-4-carboxylic acid anilide are diazotized in the usual manner in solution in hydrochloric acid. The resulting suspension of the diazo-compound is neutralized with sodium carbonate, and then coupled with a solution of 3.5 parts of 1:1'-[diphenylene-(4:4')]-bis-(3-methyl-5-pyrazolone) in 40 parts of caustic soda solution of 2.5 per cent. strength and 10 parts of sodium carbonate solution of 10 per cent. strength. When coupling is complete the dyestuff of the formula

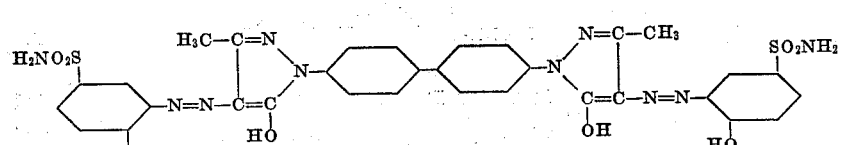

is separated by filtering, and dried. It is a red-brown powder which dissolves in concentrated sulfuric acid with a yellow coloration and dyes cellulose fibers by the single-bath or 2-bath after-coppering process fast yellow brown tints. A similar dyestuff, which dyes somewhat more yellowish tints, is obtained by starting from the compound of the formula

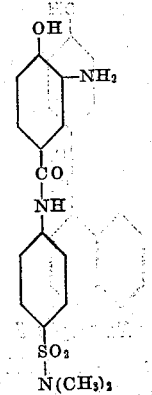

Example 4

5.6 parts of the compound of the formula

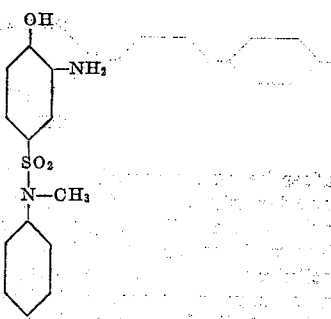

are diazotized in the usual manner in solution in hydrochloric acid. The resulting suspension of the diazo-compound is neutralized with sodium carbonate, and coupled with a solution of 3.5 parts of 1:1'-[diphenylene-(4:4')]-bis (3-methyl-5-pyrazolone) in 40 parts of caustic soda solution at 2.5 per cent. strength and 10 parts of sodium carbonate solution of 10 per cent. strength. When the coupling is complete the dyestuff of the formula

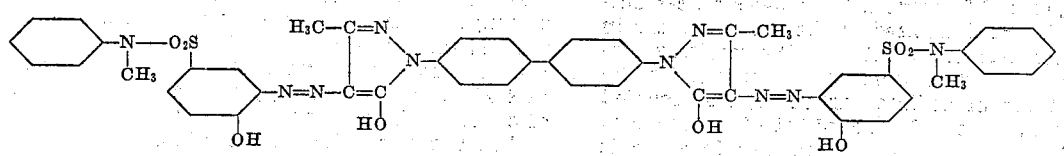

is separated by filtering, and dried. It is a red-brown powder which dissolves in concentrated sulfuric acid with a yellow coloration and in water with an orange-brown coloration, and dyes cellulose fibers by the single-bath or 2-bath after-coppering process fast reddish yellow tints. Similar dyestuffs are obtained by using, instead of the above named diazo-component, a diazo-compound of an amine of one of the following formulae

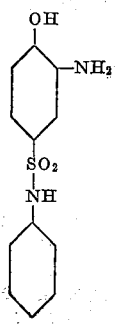

or

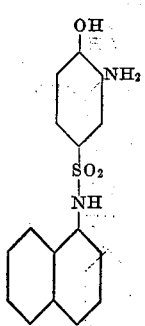

Example 5

7.44 parts of the dyestuff obtained as described in Example 1 are dissolved in 100 parts of water and 2.7 parts of caustic soda solution of 30 per cent. strength, and the whole is mixed with an alkaline solution of complex sodium-cobalt tartrate in a quantity corresponding to 5.9 parts of cobalt. The whole is heated for a short time at 60–70° C., and the cobalt compound so formed is precipitated by neutralization with acetic acid, separated by filtration, and dried under reduced pressure. 4 parts of the resulting complex cobalt compound of the dyestuff, when dissolved in 1000 parts of an ordinary commercial nitrocellulose lacquer, yield a coating composition with which yellow coatings which are fast to light can be produced on a suitable support.

Example 6

100 parts of cotton are entered at 40° C. into a dyebath which contians 0.6 part of the dyestuff obtained as described in Example 1 and 3 parts of sodium carbonate in 3000 parts of water, the temperature is raised to 90–95° C., 30 parts of Glauber salt are added, and dyeing is carried on for ¾ hour at 90–95° C. The dyebath is then cooled to 80° C., the necessary quantity of a complex copper tartrate solution rendered weakly alkaline with sodium carbonate, and containing 0.2 part of copper bound in complex union, is added, and the cotton is treated for ½ hour at 80–90° C. It is then thoroughly rinsed and if desired soaped for a short time. The cotton is dyed a fast yellow tint.

What I claim is:

1. A polyazo dyestuff which is free from sulfonic acid groups and corresponds to the formula

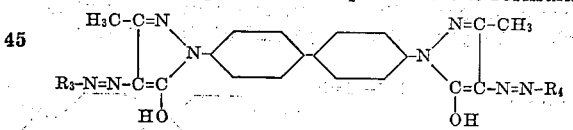

in which $R_3$ and $R_4$ each stands for the radical of a diazo component of the benzene series containing in ortho-position to the —$NH_2$— group a substituent which participates in the formation of heavy metal complexes, at least one of these diazo components corresponding to the formula

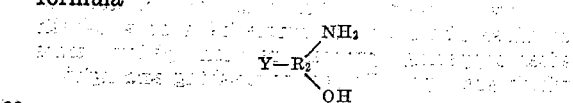

in which $R_2$ stands for a benzene radical carrying the —OH— and —$NH_2$— groups in ortho-position to one another and Y stands for an acid amide group bound by the acid radical to $R_2$ and selected from the class consisting of carboxylic acid amide and sulfonic acid amide groups.

2. A disazo-dyestuff which is free from sulfonic acid groups and corresponds to the formula

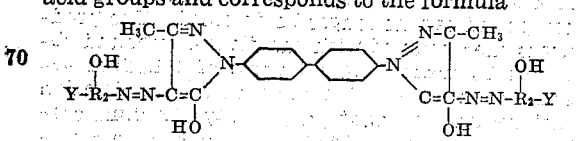

in which $R_2$ stands for a benzene radical in which the —N=N— and the —OH groups occupy positions vicinal to one another and Y stands for a carboxylic acid amide group bound by the acid radical to $R_2$.

3. A disazo-dyestuff which is free from sulfonic acid groups and corresponds to the formula

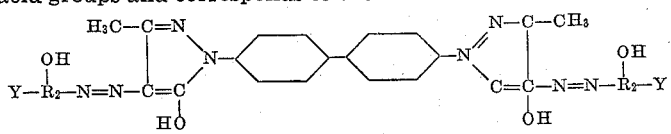

in which $R_2$ stands for a benzene radical in which the —N=N— and the —OH groups occupy positions vicinal to one another and Y stands for a sulfonic acid amide group bound by the acid radical to $R_2$.

4. A disazo-dyestuff which is free from sulfonic acid groups and which corresponds to the formula

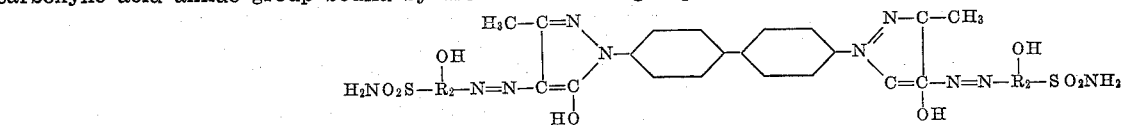

in which $R_2$ stands for a benzene radical in which the —N=N— and —OH— group occupy positions vicinal to one another.

5. The disazo-dyestuff of the formula

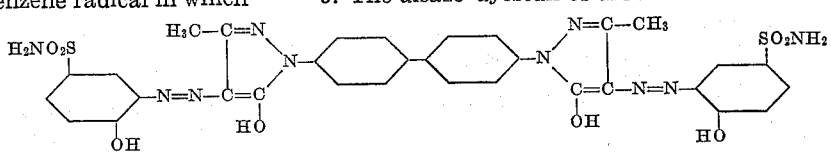

6. The disazo-dyestuff of the formula

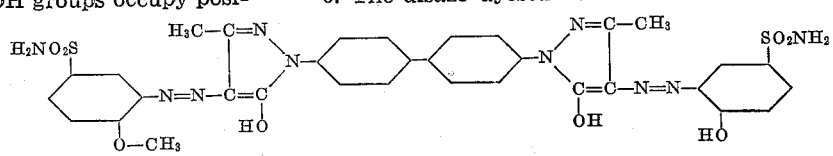

7. The disazo-dyestuff of the formula

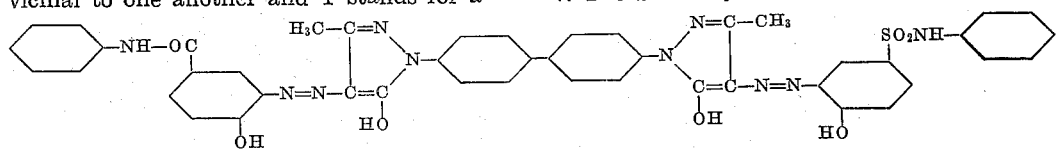

WILLY WIDMER.

REFERENCES CITED

The following references are of record in the file of this patent:

UNITED STATES PATENTS

| Number | Name | Date |
|---|---|---|
| 2,185,901 | Schmid | Jan. 2, 1940 |
| 2,195,784 | Schmid | Apr. 2, 1940 |
| 2,195,787 | Schmid | Apr. 2, 1940 |
| 2,195,788 | Schmid | Apr. 2, 1940 |
| 2,221,361 | Schmid | Nov. 12, 1940 |
| 2,221,362 | Schmid | Nov. 12, 1940 |
| 2,228,374 | Stusser et al. | Jan. 14, 1941 |
| 2,277,544 | Fischer et al. | Mar. 24, 1942 |

FOREIGN PATENTS

| Number | Country | Date |
|---|---|---|
| 650,558 | Germany | Sept. 25, 1937 |